Figure 1:
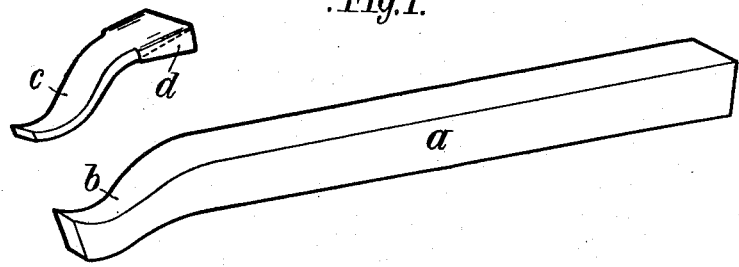

J. DE BOSREDON.
PROCESS OF MAKING TOOLS.
APPLICATION FILED OCT. 13, 1911.

1,025,735.

Patented May 7, 1912.

UNITED STATES PATENT OFFICE.

JEAN DE BOSREDON, OF PARIS, FRANCE.

PROCESS OF MAKING TOOLS.

1,025,735.   Specification of Letters Patent.   Patented May 7, 1912.

Application filed October 13, 1911. Serial No. 654,465.

*To all whom it may concern:*

Be it known that I, JEAN DE BOSREDON, a citizen of the French Republic, residing at Paris, France, have invented certain new and useful Improvements in Processes of Making Tools, of which the following is a specification.

It is well known that in a tool, whatever be its nature and application, there are two parts: one works in an active manner attacking the material to be machined, while the other forms merely a support for the former and enables it to be secured or given the movement necessary for operating it. In these conditions, it is obvious that it would be of great advantage, both from the point of view of cost price and of normal working of the tool, to make the said parts in such a manner that the material utilized for making them, should satisfy, more particularly by its qualities of strength, elasticity etc. their conditions of use. Thus, a turning tool could be for instance constituted by a soft steel body, by which it would be secured to the machine during the working period, while the working portion would be formed by a high speed steel tip.

It has been already attempted to make such tools either by utilizing tool holders in which removable tips of high speed steel were secured by any suitable means, or by rendering the tips integral with the portion of soft steel intended to support them and form with it one whole.

The first solution has the disadvantage of necessitating special tools and moreover does not fulfil the object desired, for in order to produce a perfect adhesion of the tip in the jaws of the tool holder, it is necessary that the latter should have fairly large dimensions, and consequently it is impossible, for any dimensions below the said best dimensions, to utilize completely the working steel portion. Moreover, it is impossible to secure the tool and the tool holder together thoroughly, so that the tip is exposed to vibrations affecting its work.

The second solution consists in securing the tip to a tool made of soft steel playing the same part, as regards its erecting on the machine, as an ordinary tool. It is very difficult to connect the two parts together securely, owing to the impossibility at present of finding means for direct welding of high speed steel to soft steel. In order to remedy that disadvantage, the tip was generally "set" or framed in the tool made of ordinary steel, but the work quickly destroyed the retaining lips or flanges, and the piece of high speed steel gradually became loose. Securing by a heterogeneous welding (for instance by brazing) was also tried, but the reliability was insufficient, as there was not between the two steel parts of different nature sufficiently intimate molecular connection that could resist their separation so that the tip was broken off, by its own resistance, from the piece of soft steel which underwent different deformation.

The combination of these two means; setting or framing, and heterogeneous welding, has not given any better results. Moreover, this second solution does not allow the tool constructed in accordance with these means, to be reforged or retempered.

This invention relates to a process by means of which a tip of high speed steel can be secured direct by autogenous welding to a soft steel tool, so as to obtain new products characterized by the said tip forming one piece with and being thoroughly secured to, its support, so that it is possible to consider these tools as being constituted in one piece, the elements of which have different properties. In that way, an industrial result is obtained which can be compared to that consisting for instance in tempering the working surface of a soft steel tool, with the essential difference that the said portion is constituted by a high speed steel.

Figure 2:
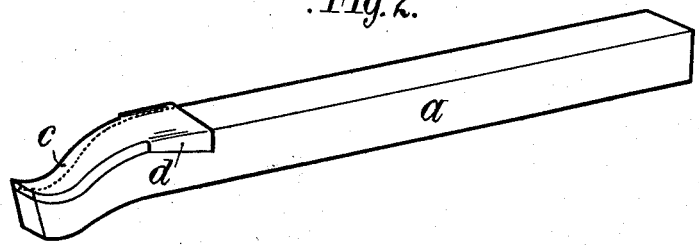
Figure 3:
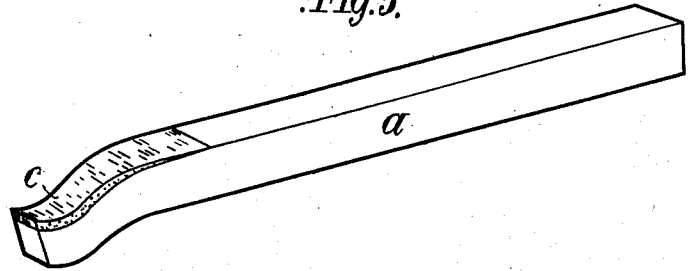

In the accompanying drawing given by way of example, Figure 1 shows the blank of a turning tool and the formation of the high speed steel tip which is to be welded to it. Fig. 2 shows the said parts superposed before welding, and Fig. 3 is a view of the same tool after welding and erecting.

For carrying out the process according to this invention, the support $a$ of soft steel is made in such manner as to give it the shape of an ordinary tool, and the application surface $b$ which is to receive the tip $c$ of high speed steel forming the working part, is scraped out. This surface of application $b$ is, if necessary, machined in such manner that the corresponding contact surface of the tip $c$, previously shaped, should exactly and closely fit it. As shown in the drawing, the tip $c$ is given at its rear portion such a shape that it rests against a shoulder provided in the support $a$, or joins its outer surface. It can also be provided with lateral ribs *d* which do not form a framing or splicing, but are merely intended to indicate the position of the tip *c* on the tool *a* and to prevent any relative movement during the subsequent manipulations (Fig. 2).

For bringing about automatic welding of the tip *c* of high speed steel on the support *a* of soft steel, the steel of the greatest expansion is heated to about 800°, and the other part to about 900°, whereupon they are superposed, some anti-oxidizing material, for instance borax, being placed between the surfaces in contact.

The parts connected together, are submitted to a sufficient pressure for insuring adhesion, the said action taking place without shocks, and by any suitable means, by arranging for instance the whole in a die which guides the tip on the tool and keeps it during the application of the pressure. This first stage of treatment insures an adhesion of the two surfaces in contact, but in order to bring about a real welding, the whole is placed into a furnace where it can be heated to between 1200 and 1400°. When the tool is raised to that temperature, it is introduced into a die which it fits exactly, and submitted to a very strong pressure exercised by any suitable means, but without shocks. In these conditions, the point or tip *c* of high speed steel, and the supporting tool *a* being submitted to such a pressure that there can take place no deformation or expansion (since the die prevents any shifting of the material), are welded together by a kind of filtration and molecular exchange taking place between both the surfaces of contact, owing to the elevation of temperature which makes possible a movement of the molecules. In these conditions, a whole is obtained (Fig. 3) the parts of which are inseparably secured together, so that the tool can be subsequently submitted to any physical or thermic treatments like an ordinary tool. Thus the tool is finally shaped by grinding, then the tip is tempered in petroleum or air or in any other way, or by any other suitable process used for high speed steels.

The tools thus obtained can be forged and tempered again, if necessary, practical experience having shown that the welding of the high speed steel tip on the soft steel tool is such that it can undergo any thermic treatments and mechanical actions necessitated by the said various operations.

What I claim as my invention and desire to secure by Letters Patent is:—

1. The process of making tools, having a working part of high speed steel and a body of softer metal, comprising shaping the working part and body to fit closely together, preliminarily heating said part and the section of the body to which it is to be applied to temperatures which are a function of their coefficients of expansion, fitting the working part to the body under pressure, subsequently heating said assembled members to a temperature in excess of that of the preliminary heating and then arranging them in a matrix of suitable shape and subjecting them to pressure.

2. A process for making tools consisting in shaping a working part of high speed steel and a support part of soft steel to fit together, heating the part having the highest coefficient of expansion to about 800° and the other part to about 900°, interposing an anti-oxidizing material between the parts, placing them together, submitting them to pressure, and subsequently heating them to about 1200–1400°, and again submitting them to strong pressure.

In testimony whereof I have signed my name to this specification in the presence of two subscribing witnesses.

JEAN de BOSREDON.

Witnesses:
 H. C. COXE,
 GEORGES BONNEUIL.